(12) United States Patent
Hashiguchi

(10) Patent No.: US 10,322,622 B2
(45) Date of Patent: Jun. 18, 2019

(54) VEHICULAR DOOR STRUCTURE

(71) Applicant: HONDA MOTOR CO., LTD., Tokyo (JP)

(72) Inventor: Sotaro Hashiguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/830,551

(22) Filed: Dec. 4, 2017

(65) Prior Publication Data

US 2018/0154744 A1    Jun. 7, 2018

(30) Foreign Application Priority Data

Dec. 6, 2016    (JP) .................................. 2016-236552

(51) Int. Cl.
| | |
|---|---|
| *B60J 5/04* | (2006.01) |
| *B60R 11/02* | (2006.01) |
| *B60R 7/04* | (2006.01) |
| *B60R 11/00* | (2006.01) |

(52) U.S. Cl.
CPC ............. *B60J 5/0413* (2013.01); *B60R 7/046* (2013.01); *B60R 11/0217* (2013.01); *B60R 2011/0021* (2013.01)

(58) Field of Classification Search
CPC ..... B60J 5/0413; B60R 7/046; B60R 11/0217
USPC ............................. 296/146.7, 146.5; 49/502
See application file for complete search history.

(56) References Cited

U.S. PATENT DOCUMENTS

| | | | |
|---|---|---|---|
| 5,927,020 A | 7/1999 | Kobrehel | |
| 7,051,438 B2 * | 5/2006 | O'Brien | ................. B60J 5/0416 |
| | | | 29/469 |
| 7,237,825 B1 * | 7/2007 | Tilli | ....................... B60J 5/0416 |
| | | | 296/146.7 |
| 2004/0012226 A1 * | 1/2004 | Morrison | ............... B60J 5/0416 |
| | | | 296/146.5 |
| 2004/0134711 A1 | 7/2004 | Yoshimi et al. | |
| 2007/0086609 A1 | 4/2007 | Gomi | |
| 2008/0178533 A1 | 7/2008 | Nakamori et al. | |

FOREIGN PATENT DOCUMENTS

| | | |
|---|---|---|
| JP | S53-32414 Y | 8/1978 |
| JP | S5848525 U | 4/1983 |
| JP | S60-115758 U | 8/1985 |
| JP | H068105 U | 2/1994 |
| JP | 2004-214852 A | 7/2004 |
| JP | 2007-106280 | 4/2007 |
| JP | 2011-189843 | 9/2011 |
| KR | 20090107656 A | 10/2009 |
| WO | 2006/114973 A1 | 11/2006 |

OTHER PUBLICATIONS

Japanese Office Action with English Translation dated Aug. 28, 2018, 6 pages.
Japanese Office Action with English Translation dated May 15, 2018, 9 pages.

* cited by examiner

*Primary Examiner* — Joseph D. Pape
(74) *Attorney, Agent, or Firm* — Rankin, Hill & Clark LLP

(57) ABSTRACT

A vehicular door structure has a side door adapted to open and close an opening of a vehicle body, and the side door includes a door storage part having a storage area, and a door speaker. The door speaker is located above the door storage part in a virtual up-down direction and disposed near a central part in the up-down direction of the side door.

2 Claims, 4 Drawing Sheets

VEHICULAR DOOR STRUCTURE

CROSS-REFERENCE TO RELATED APPLICATION

This application is based upon and claims priority from the Japanese Patent Application No. 2016-236552, filed on Dec. 6, 2016, the entire contents of which are incorporated herein by reference.

BACKGROUND OF THE INVENTION

1. Field of the Invention

The present invention relates to a vehicular door structure.

2. Description of the Related Art

For example, Patent document 1 (Japanese Unexamined Patent Application Publication No. 2011-189843) discloses a door structure in which a side door includes a door pocket provided below an armrest, and a speaker grille provided on the vehicle front side of the door pocket in a horizontal direction, allowing the door pocket and the speaker grille to be laterally disposed side by side.

Incidentally, the door structure disclosed in Patent document 1 allows the door pocket and the speaker grille to be disposed at positions of nearly the same height in the up-down direction of the vehicle. Because of this, for example, when attempting to increase storage capacity of the door pocket in the door structure disclosed in Patent document 1, the speaker grille existing horizontally gets in the way, which makes it difficult to secure a sufficient storage capacity of the door pocket.

SUMMARY OF THE INVENTION

The present invention is made in view of the above problems, and an object of the invention is to provide a vehicular door structure capable of increasing storage capacity of a storage part as compared to the conventional art.

In order to achieve the above object, the present invention provides a vehicular door structure having a door adapted to open and close an opening of a vehicle body, the door including: a storage part having a storage area; and a speaker, wherein the speaker is located above the storage part and disposed near a central part in an up-down direction of the door.

The present invention makes it possible to obtain a vehicular door structure capable of increasing storage capacity of a storage part as compared to the conventional art.

DETAILED DESCRIPTION OF THE PREFERRED EMBODIMENTS

Embodiments of the present invention will be hereinafter described in detail with reference to the drawings as appropriate.

Note that in each figure of the drawings, "front-rear", "right-left", and "up-down" indicate a front-rear direction of a vehicle, a width direction of the vehicle (right-left direction), and a vertical up-down direction of the vehicle, respectively.

Figure 2:
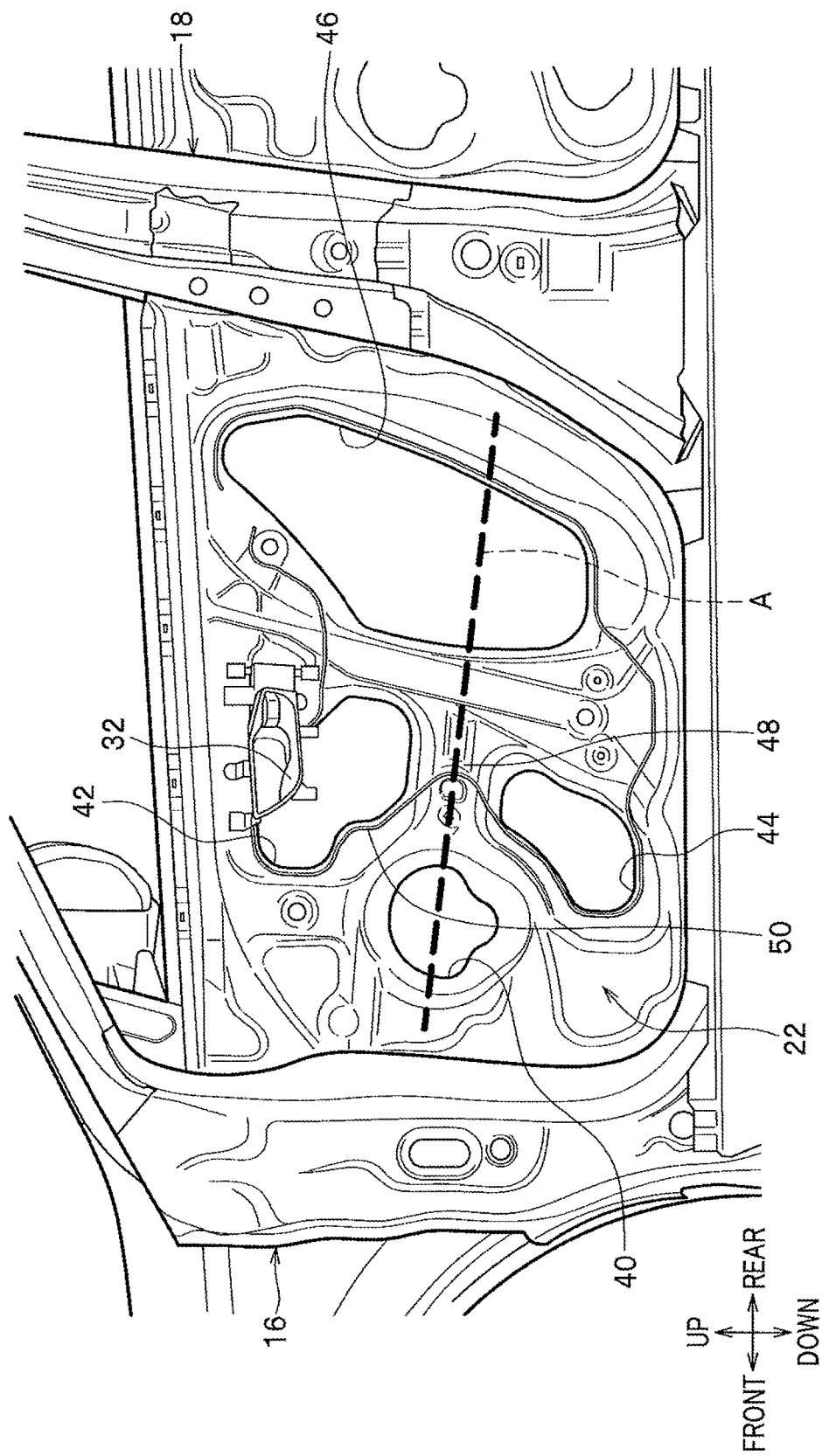
FIG. 2 is a side view of an inner panel composing the side door shown in FIG. 1, which is viewed from the vehicle interior side in a state of the side door being mounted on a vehicle body.
Figure 3:
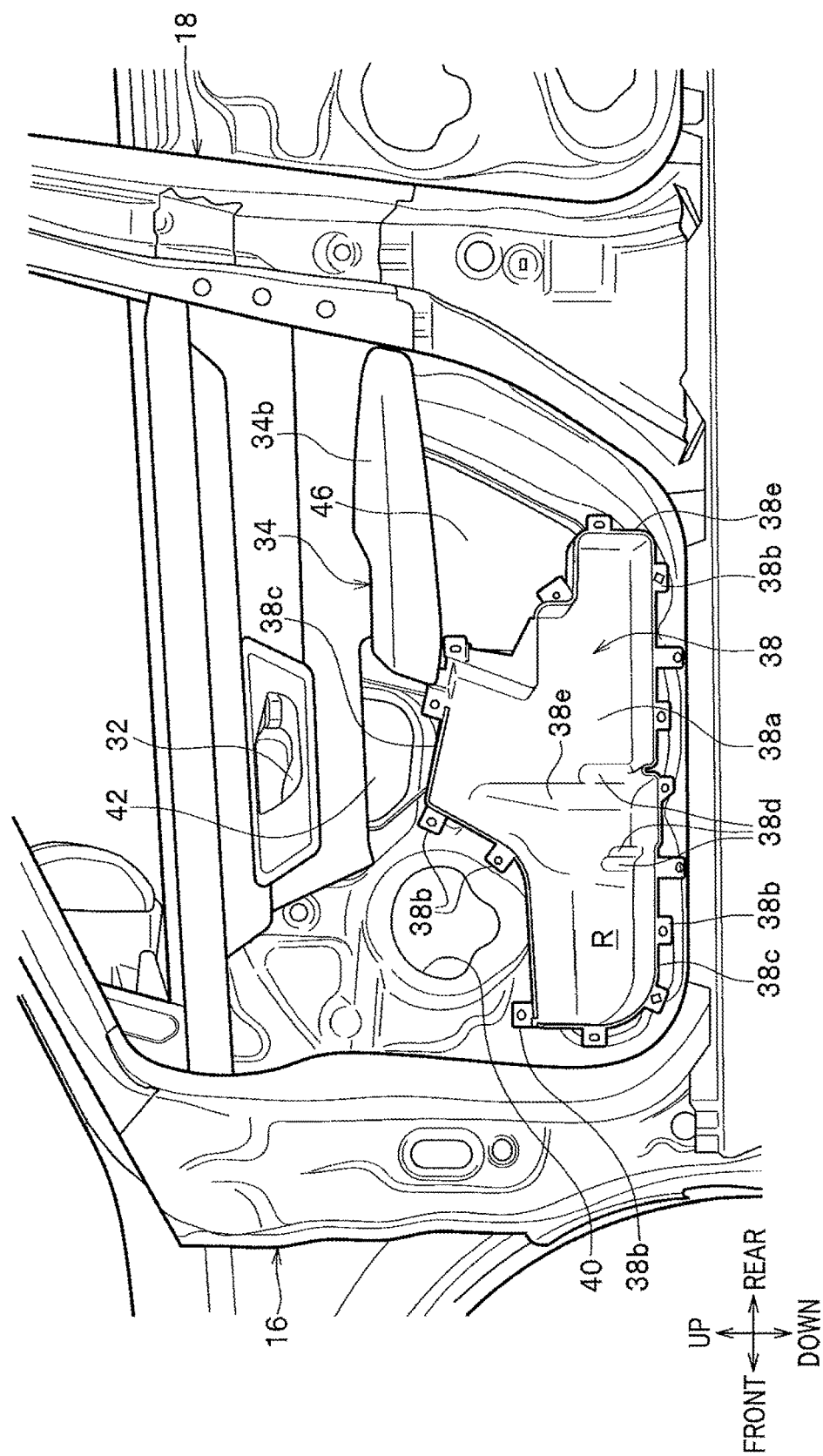
FIG. 3 is a side view showing a state in which a storage inner part and the like are attached to the inner panel shown in FIG. 2.
Figure 4:
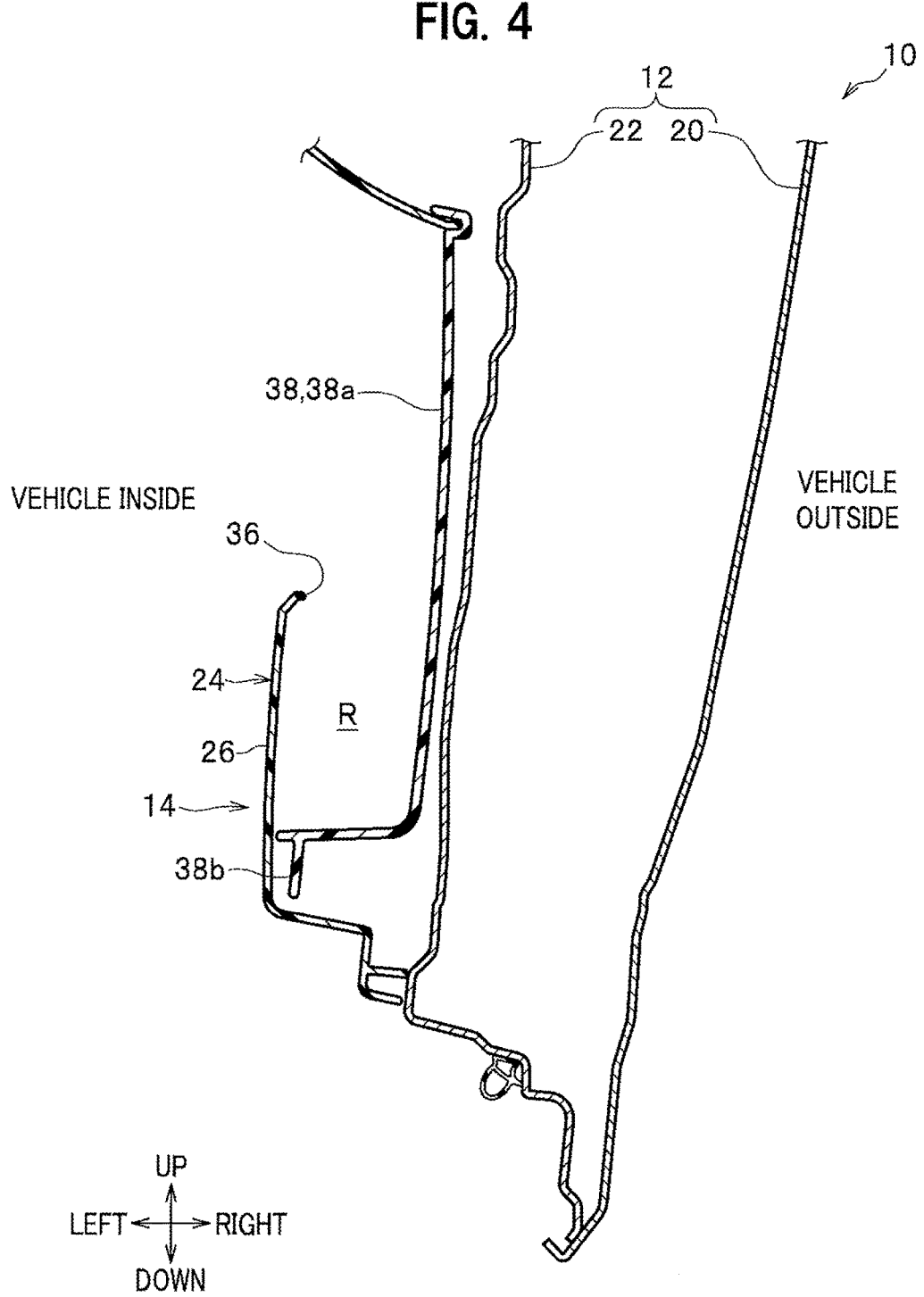
FIG. 4 is an end view taken along the line IV-IV shown in FIG. 1.

A side door (door) 10 at the front side, to which a vehicular door structure according to an embodiment of the present invention is applied, is adapted to open and close an opening that is formed between a front pillar (A-pillar) 16 and a center pillar (B-pillar) 18 (see FIG. 2 and FIG. 3). As shown in FIG. 4, the side door 10 is provided with a side door body 12 and a door trim 14 which is an upholstery member that covers the side door body 12 from the vehicle interior side.

The side door body 12 includes an outer panel (door outer panel) 20 and an inner panel (door inner panel) 22, and is composed as a hollow structure obtained by joining peripheral edges of the outer panel 20 and the inner panel 22 together by hemming or the like (see FIG. 4).

The outer panel 20 is composed of a panel that is disposed on the vehicle outside opposite to the inner panel 22 to face the outside of the vehicle. The outer panel 20 is formed, for example, by press working of light alloy materials such as aluminum alloy or magnesium.

The inner panel 22 is composed of a frame member that is disposed on the vehicle inside opposite to the outer panel 20 to face the door trim 14. In other words, the inner panel 22 is disposed between the outer panel 20 and the door trim 14. The inner panel 22 is formed, for example, by casting of light alloy materials such as aluminum alloy or magnesium. Materials of the outer panel 20 and the inner panel 22 are not limited to the light alloy materials, but the outer panel 20 and the inner panel 22 may be formed of, for example, steel materials. Note that the inner panel 22 will be described in detail later.

The door trim 14 is an upholstery member that faces the vehicle interior, and provided to cover nearly the entire face of the inner panel 22. The door trim 14 includes, as parts thereof, a storage inner part 26 (see FIG. 4) provided at a position corresponding to a door storage part 24 to be described later, and a speaker grille 30 (see FIG. 1) provided at a position corresponding to a door speaker 28 to be described later.

Figure 1:
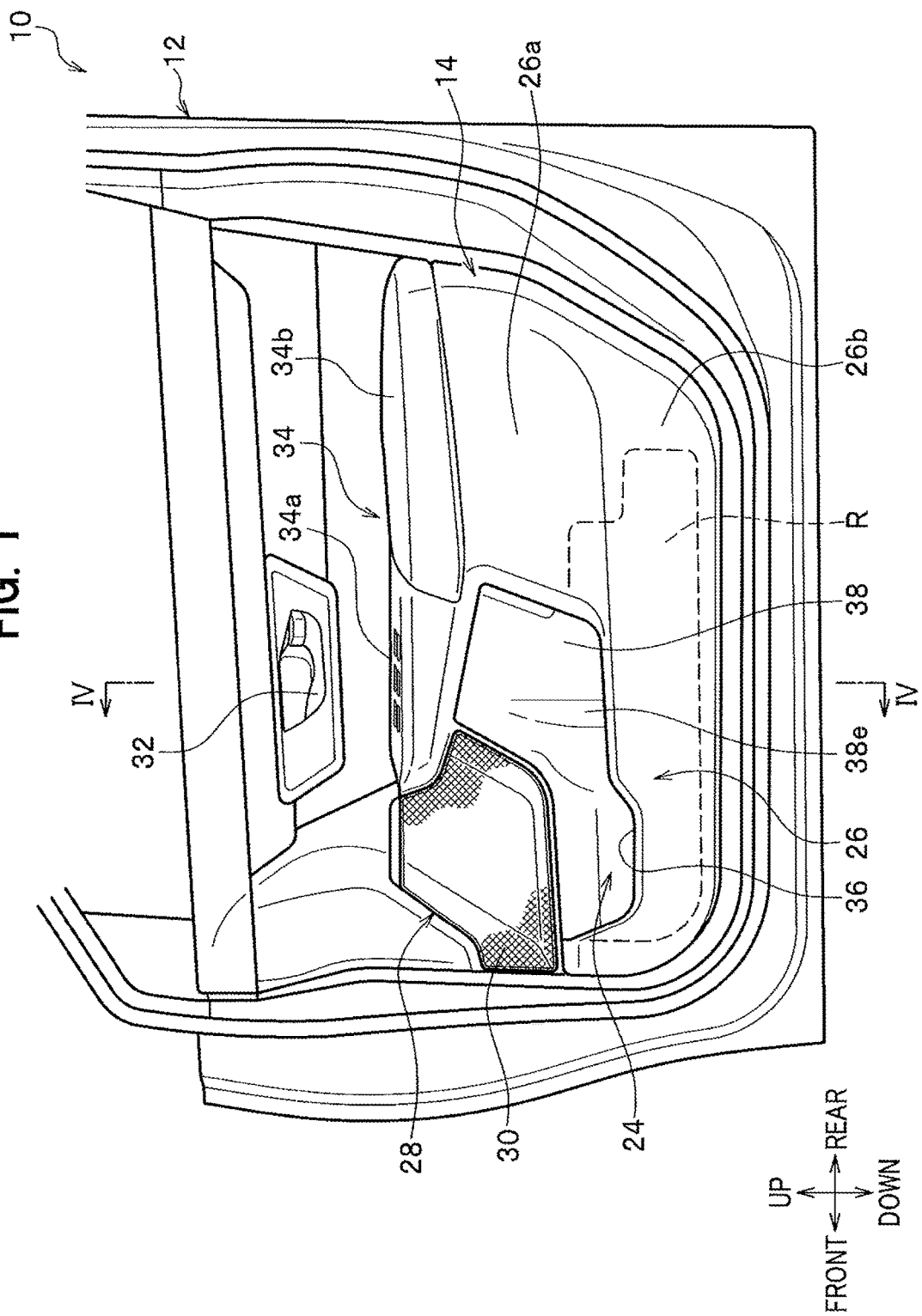
FIG. 1 is a side view of a side door at a front side to which a vehicular door structure according to an embodiment of the present invention is applied, and which is viewed from the vehicle interior side.

As shown in FIG. 1, on the vehicle interior side of the side door 10 (door trim 14), a door handle 32, an armrest part 34, the door speaker (speaker) 28, and the door storage part (storage part) 24 are disposed in order downward from the upper side, respectively.

The door handle 32 is disposed at nearly a central part in an upper part of the side door body 12. The armrest part 34 is disposed below the door handle 32 along the front-rear direction of the vehicle, and has a switch base 34a on which various switches are provided, and an armrest body 34b. Note that the switch base 34a and the armrest body 34b may have a small storage part provided therein, which is capable of storing, for example, cards, but such a small storage part is not the "storage part" set forth in the claims.

The door storage part 24 has a storage area R (see FIG. 3) capable of storing relatively large on-vehicle objects such as, for example, maps and books. The door storage part 24 has an opening section 36 (see FIG. 1) that is communicated with the storage area R and elongated in the front-rear direction of the vehicle. The door storage part 24 is composed of the storage inner part 26 that is a part of the door trim 14 and located on the vehicle inside, and a storage outer part 38 that is located on the vehicle outside and mounted on (fastened to) the inner panel 22 (see FIG. 4).

As shown in FIG. 1, when viewed laterally from the vehicle interior side, the storage inner part 26 has a vertical wall part 26a that extends downward from the armrest part 34, and a horizontal wall part 26b that extends along the front-rear direction of the vehicle (the width direction of the side door 10) and is communicated with a lower end of the vertical wall part 26a. The storage inner part 26 has the form of nearly L shape which allows the vertical wall part 26a and the horizontal wall part 26b to surround the opening section 36.

As shown in FIG. 3, the storage outer part 38 has a side wall part 38a that faces the inner panel 22, a plurality of claw parts 38b that are fastened to the inner panel 22 via screws (not shown), and a projecting wall 38c that projects from a peripheral edge of the side wall part 38a toward the storage inner part 26 side (the door trim 14 side). Moreover, provided on the side wall part 38a are a plurality of partitioning parts 38d that project toward the storage inner part 26 side to partition the storage area R, and a storage recess 38e composed of a recess that becomes hollow toward the outer panel 20 side and capable of storing therein, for example, PET bottles or the like.

Referring back to FIG. 1, the door speaker 28 is located above the door storage part 24 and disposed near a central part in the up-down direction (identical with the vertical up-down direction) of the side door 10. In other words, the door speaker 28 and the door storage part 24 are disposed not at positions of nearly the same height in the vertical up-down direction as in the conventional art, but at positions of different heights in the vertical up-down direction, i.e., to have a positional relation in the vertical up-down direction.

Moreover, the door speaker 28 has a speaker body (not shown), and the speaker body is attached to be secured to a speaker attaching section 40 of the inner panel 22 and covered by the speaker grille 30 that composes a part of the door trim 14 disposed on the vehicle inside.

Moreover, the speaker body is provided with, as an example thereof, a speaker box (not shown), a frame (not shown), a cone paper (not shown) supported by the frame, and a voice coil (magnet) (not shown) that vibrates the cone paper. The speaker body is adapted to allow the voice coil to vibrate the cone paper, thereby emitting sound.

As shown in FIG. 2, the inner panel 22 composing the side door 10 is further provided with a first working opening 42, a second working opening 44 and a third working opening 46 that are formed through the inner panel 22 in the vehicle width direction, a bridge section 48 that is located between the first working opening 42 and the second working opening 44 and formed to partition between (bridge over) the first working opening 42 and the second working opening 44, and the speaker attaching section 40 to which the door speaker 28 is attached. Moreover, the speaker attaching section 40 is composed of an opening section having a nearly circular shape which is a through-hole formed through the inner panel 22 in the vehicle width direction.

The first working opening 42 is disposed to be located nearer the vehicle front side than the third working opening 46 and on the upper side of the second working opening 44 in the vertical direction. The second working opening 44 is disposed to be located nearer the vehicle front side than the third working opening 46 and on the lower side of the first working opening 42 in the vertical direction. The third working opening 46 is located nearer the vehicle rear side than the first working opening 42 and the second working opening 44, and is formed of a larger opening section than the first working opening 42 and the second working opening 44. In other words, the third working opening 46 is disposed at a side opposite to the speaker attaching section 40 across the bridge section 48 (at the vehicle rear side), and is disposed on an extended line A (see a thick broken line in FIG. 2) of the bridge section 48.

The speaker attaching section 40 is disposed at a position close to the first working opening 42, the second working opening 44, and the bridge section 48, respectively. Moreover, the speaker attaching section 40 is disposed to be located on the extended line A (see the thick broken line in FIG. 2) which extends toward the vehicle front side of the bridge section 48.

The bridge section 48 has a fragile part provided therein. The fragile part is composed of a water cut-off bead 50 in the form of a stepped portion to which a water cut-off member (not shown) is attached. The water cut-off bead 50 is disposed to cross an imaginary line A (identical with the extended line A in FIG. 2) that connects the bridge section 48 with the speaker attaching section 40. As shown in FIG. 2, the water cut-off bead 50 is formed to nearly surround the first working opening 42, the second working opening 44, the third working opening 46, and a part on the vehicle rear side of the bridge section 48. Providing the water cut-off member (not shown) causes water to be prevented from entering from the first to third working openings 42, 44, 46 into a hollow space between the inner panel 22 and the door trim 14.

Note that, although the present embodiment allows the door speaker 28 to be disposed above the door storage part 24 as shown in FIG. 1, disposition of the door speaker 28 and the door storage part 24 is not limited to this example. For example, a configuration reversing the up-and-down relation may be adopted such that the door speaker 28 is disposed below the door storage part 24 and the door speaker 28 is disposed near the central part in the up-down direction of the side door 10.

The side door 10 to which the vehicular door structure according to the present embodiment is applied is basically configured as described above, and the operation and advantageous effects of the door structure will be described below.

The present embodiment allows the door speaker 28 to be disposed above the door storage part 24 in the vertical up-down direction. This allows the present embodiment, where the door speaker 28 is attached with the same size as in the conventional art, to prevent the door speaker 28 from getting in the way of the door storage part 24 in the width direction of the side door 10, thus making it possible to increase a storage area R of the door storage part 24. Consequently, the present embodiment makes it possible to secure a sufficient storage capacity of the door storage part 24 and thus to improve convenience of the door storage part 24. Note that the width direction of the side door 10 is identical with the front-rear direction of the vehicle.

The present embodiment allows the door speaker 28 to be disposed near the central part in the up-down direction of the side door 10. This allows the present embodiment, as compared to, for example, a case where the door speaker 28 is disposed at the ends in the up-down direction of the side door 10 (joining regions between the outer panel 20 and the inner panel 22), to make vibration hard to be propagated through hard regions which are the ends in the up-down direction, thus making it possible to suppress vibration of the entire side door 10.

Also, the present embodiment allows the speaker attaching section 40 to be disposed at a position close to the first working opening 42, the second working opening 44, and the bridge section 48, and allows the speaker attaching section 40 to be disposed on the extended line A of the bridge section 48. This allows the present embodiment to make it possible to allow vibration generated by the door speaker 28 to be transmitted to the speaker attaching section 40, then to pass through the bridge section 48 concentratedly, and subsequently to be directed to the entire side door 10.

Consequently, the present embodiment makes it possible to allow the vibration to be concentrated not on the ends having high rigidity and strength in the up-down direction of the side door 10, but on the bridge section 48 having low rigidity and strength, thereby suppressing the vibration of the entire side door 10.

Further, the present embodiment allows the bridge section 48 to have a fragile part provided therein. This allows the present embodiment to make it possible to allow the vibration transmitted to the speaker attaching section 40 to be attenuated through the bridge section 48 functioning as the fragile part. Consequently, the present embodiment allows the vibration to be made hard to spread from the bridge section 48 to the speaker attaching section 40 side and from the bridge section 48 to the opposite side (the entire side door), thus making it possible to suppress the vibration of the entire side door 10.

Moreover, the present embodiment allows the water cut-off bead 50 functioning as the fragile part to be disposed to cross the imaginary line A that connects the bridge section 48 with the speaker attaching section 40. This allows the present embodiment to make it possible to allow the vibration to be attenuated with the water cut-off bead 50 set as a boundary. Consequently, the present embodiment allows the vibration to be made hard to spread from the bridge section 48 to the speaker attaching section 40 side and from the bridge section 48 to the opposite side (the entire side door), thus making it possible to suppress the vibration of the entire side door 10. In addition, the present embodiment makes it possible to effectively utilize the water cut-off bead 50 attaching thereon a water cut-off member, as the vibration attenuating means, thereby eliminating the need for new components and/or structures and thus suppressing a rise in production cost.

Furthermore, the present embodiment allows the third working opening 46 to be disposed at the side opposite to the speaker attaching section 40 across the bridge section 48 and on the extended line A on the vehicle rear side of the bridge section 48. This allows the present embodiment to make it possible, where the vibration is propagated through the bridge section 48 to the third working opening 46 side, to cut off the propagated vibration at the third working opening 46. Consequently, the present embodiment makes it possible to suppress the vibration of the entire side door 10.

In addition, for example, even in a case where a configuration reversing the up-and-down relation is adopted such that the door speaker 28 is disposed below the door storage part 24 and the door speaker 28 is disposed near the central part in the up-down direction of the side door 10, the same operation and advantageous effects as in the present embodiment described above can be obtained.

DESCRIPTION OF REFERENCE SIGNS

10: Side door (Door);
24: Door storage part (Storage part);
28: Door speaker (Speaker);
40: Speaker attaching section;
42: First working opening;
44: Second working opening;
46: Third working opening;
48: Bridge section;
50: Water cut-off bead;
R: Storage area;
A: Extended line (Imaginary line)

What is claimed is:

1. A vehicular door structure having a door adapted to open and close an opening of a vehicle body,
the door comprising:
a storage part having a storage area;
a speaker that is located either above or below the storage part and disposed near a central part of the door in an up-down direction of the door;
a first working opening and a second working opening that are formed to pass through an inner panel of the door in a door width direction;
a bridge section formed to partition between the first working opening and the second working opening; and
a speaker attaching section to which the speaker is attached,
wherein
the speaker attaching section is disposed close to the first working opening, the second working opening, and the bridge section, respectively, and the speaker attaching section is located on an imaginary line that connects the bridge section with the speaker attaching section, and
the bridge section has a fragile part constituting a water cut-off bead provided therein, the water cut-off bead being disposed across the imaginary line.

2. The vehicular door structure according to claim 1, wherein
the door further comprises a third working opening, and the third working opening is disposed oppositely to the speaker attaching section across the bridge section and on the imaginary line.

* * * * *